United States Patent Office 3,290,320
Patented Dec. 6, 1966

3,290,320
BENZOYL PYRIDINE OXIMINO ETHERS AND METHODS FOR THEIR MANUFACTURE
Frank J. Villani, West Caldwell, N.J., assignor to Schering Corporation, Bloomfield, N.J., a corporation of New Jersey
No Drawing. Filed June 12, 1963, Ser. No. 287,205
10 Claims. (Cl. 260—295)

This invention relates to compositions of matter identifiable as oximino derivatives of benzoyl pyridines and to processes for making and using such compositions.

The invention sought to be patented in its composition aspect is described as residing in the concept of a chemical compound having the molecular structure of a benzoyl pyridine oxime in which the hydrogen atom of the oximino portion has been replaced by the substituent —Q—T, with Q being a member of the group consisting of carbonyl and lower alkylene while T is a di-lower alkyl amino group or its hereinafter disclosed equivalent.

The invention sought to be patented in its process aspect is described as residing in the concept of preparing the tangible embodiments of the composition aspect by the reaction of a benzoyl pyridine with a substituted hydroxylamine, that is one of the formula $H_2NOQT$ (where Q and T are as above defined) or in the alternative reacting a benzoyl pyridine oxime with an alkylating agent such as of the formula ClQT (where Q and T are as above defined).

The tangible embodiments of the composition aspect of the invention possess the inherent general physical properties of being substantially insoluble in water, soluble in aqueous acid and soluble in most common organic solvents. Those compositions wherein Q represents lower alkylene are generally high boiling liquids purifiable by vacuum distillation while those wherein Q represents carbonyl are generally white crystalline solids at room temperature.

The tanglible embodiments of the invention possess the inherent applied use characteristics of exerting an anti-androgenic effect as evidenced by pharmacological evaluation.

They are thus useful in countering the effects of androgen induced conditions or states.

As used herein, the term "lower alkylene" means a bi-valent hydrocarbon radical including straight and branched chain radicals among which are ethylene, 1,3-propylene, 1,2-propylene, 1,4-butylene, 1,2-butylene, 1,3-butylene, 1,5-pentylene, 2-ethyl-1,3-propylene and the like. Further, as used herein, the term "di-lower alkylamino" means an amino group substituted by lower alkyl radicals including the straight and branched chain radicals among which are methyl, ethyl, propyl and the like. Obvious cyclic equivalents of the "di-lower alkyl amino" groups are, for example, pyrrolidino, piperidino, morpholino and piperazino.

In one of the process aspects, the tangible embodiments of this invention are prepared by reacting a benzoyl pyridine with a di-lower alkylamino lower alkyl hydroxylamine (referred to above as $H_2NOQT$). The substituted hydroxylamine reagent is preferably used in the form of its acid addition salt, such as in the form of a dihydrochloride. The substituted hydroxylamine reagent can be prepared by methods well-known in the art. Exemplary of such known methods is the following general procedure which involves treating an acetone oxime (I) with a di-alkylaminoalkylhalide (dimethylaminoethylchloride (II)) in the presence of a base such as sodamide or sodium ethoxide. The dimethylaminoethyloximino derivative (III) is isolated by distillation upon treatment with dilute acid, the oxime (III) is split regenerating acetone and the substituted hydroxylamine (IV) which is used in preparing a tangible embodiment of the instant invention.

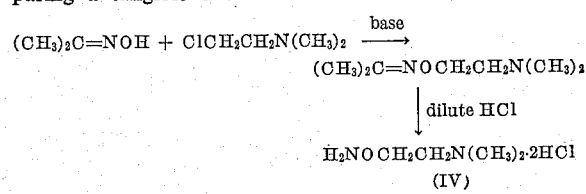

The other amino alkylhydroxylamines discussed above in conjunction with the definitions of Q and T are the full equivalents of dimethylaminoethoxyamine, IV above, and can be prepared in a manner similar to that described for preparing dimethylaminoethoxyamine. This process is best utilized to prepare the tangible embodiments of this invention when Q represents lower alkylene.

The substituted hydroxylamine reagent (IV) is reacted with a benzoyl pyridine (V) preferably in a polar organic solvent in the presence of a tertiary base. It has been found that ethanol-pyridine affords a satisfactory solvent. Heating the mixture at reflux results in oximation of the benzoyl pyridine (V) resulting in the formation of a tangible embodiment of this invention (VI). This latter salt is transformed into its base form (VII) by usual procedures involving use of a base and extracting solvents such as chloroform. The compounds such as VII are purified in the first instance by distillation.

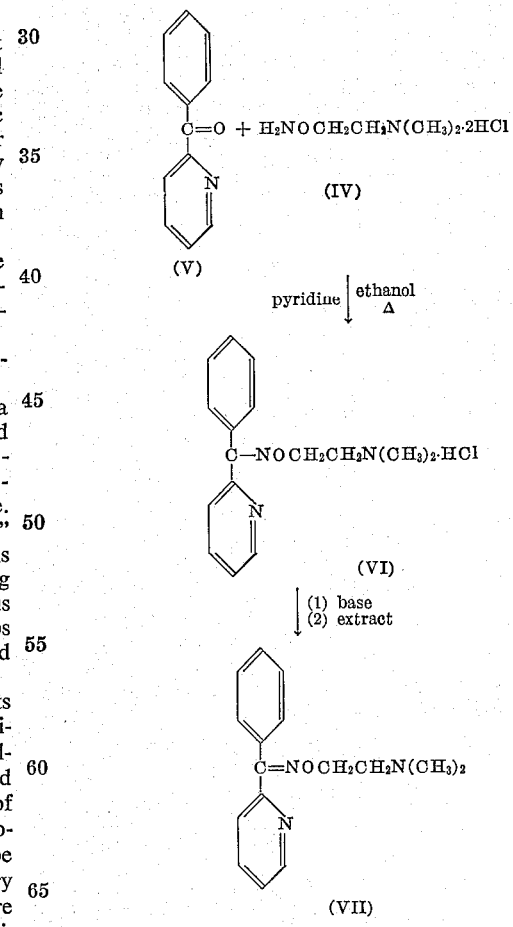

An alternate method for preparing the tangible embodiment of this invention, especially that where Q represents carbonyl, is shown in the following general procedure which involves treating a benzoyl pyridine oxime (VIII) with a di-lower alkylamino alkyl halide (II) or a carbonyl halide (IX) in the presence of a basic agent followed by work-up in a usual manner. There is thus produced VII or its carbonyl counterpart (X).

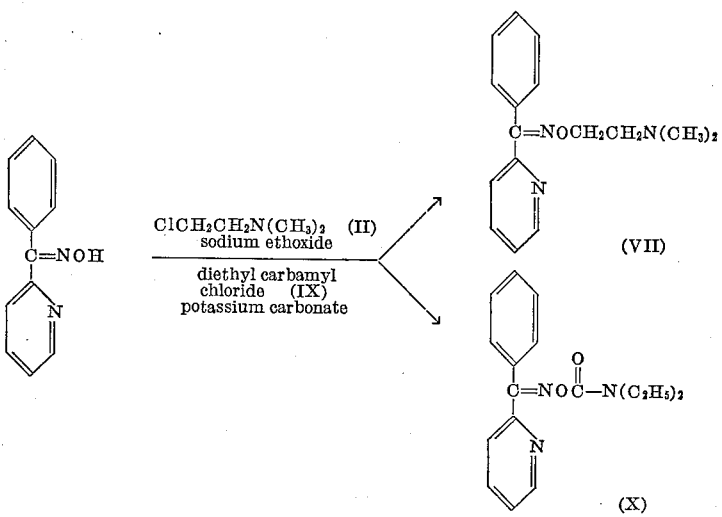

These latter alkylation reactions are generally effected in a refluxing solvent and worked up by neutralization and extraction. The base is present to take up the acid formed during the reaction, however, as will be apparent to one skilled in the art, the reactions may be effected with the presence of a base which may be added sequentially to neutralize the acid addition salt of the reaction product.

In the foregoing descriptions, oximino ether derivatives of 2-benzoyl pyridine have been exemplified but only by way of example. Contemplated as the full equivalent of such derivatives are those wherein the phenyl group bears one or more common substituents such as halogen (preferably chloro or bromo), lower alkyl (preferably methyl), lower alkoxy (preferably methoxy), hydroxy, trifluoromethyl and the like. These substituents do not materially alter the properties of the product but provide one which differs from the unsubstituted product more in degree than in kind. Similarly, the pyridyl moiety may be a 3-pyridyl or 4-pyridyl which are contemplated as the full equivalents of the 2-pyridyl compounds described.

The following preparations and examples are illustrative of the preferred modes for carrying out the invention.

PREPARATION OF STARTING MATERIALS

PREPARATION A.—OXIME REAGENT

*Dimethylaminoethoxyamine dihydrochloride*

Admix 73 g. acetone-oxime, 1 mole of dimethylaminoethylchloride hydrochloride, 427 g. of anhydrous potassium carbonate and 1.5 l. benzene. Stir and reflux overnight. Cool, filter, and wash precipitate with hot benzene. Combine filtrates, concentrate to a residue and distill in vacuo to obtain the dimethylaminoethyl ether of acetone-oxime (B.P. 85–88°/50 mm.).

Admix 100 g. of the ether obtained above and 1 liter of 10% aqueous hydrochloric acid. Stir on a steam bath for 15 hours. Concentrate to a residue in vacuo. Recrystallize the residue from methanolether solvent obtaining dimethylaminoethoxyamine dihydrochloride, M.P. 181–182.5° C.

By substituting other equivalent tertiary-aminoalkyl-chloride hydrochlorides for dimethylaminoethylchloride hydrochloride in the above preparation, the corresponding t-aminoalkoxyamine hydrochlorides are obtainable. Accordingly, there may be prepared by this method oxime reagents exemplified by the following alkoxyamines (it is understood that these reagents are prepared as above and are obtained in the form of their dihydrochloride salts): dimethylaminopropoxyamine, dimethylaminobutoxyamine, diethylaminoethoxyamine, diethylamino- propoxyamine, diethylaminoisopropoxyamine, diethylaminopentoxyamine, pyrrolidinoethoxyamine, pyrrolidinopropoxyamine, piperidinoethoxyamine, piperidinopropoxyamine, morpholinoethoxyamine, morpholinobutoxyamine, piperazinoethoxyamine, N - 1 - methyl-N-4-piperazinoethoxyamine and N-1-(hydroxyethyl)-N-4-propoxyamine.

PREPARATION B.—BENZOYL PYRIDINES

For the most part, the benzoyl pyridines utilized as starting materials in this invention are known or are prepared by methods described in the art. For convenience, two of such methods are set forth as follows:

*(1) Reaction of a benzonitrile with a pyridyl lithium to yield a benzoyl pyridine*

Add a solution of 11 g. of 2-methoxybenzonitrile in 50 ml. of ether to 2-pyridyl lithium (prepared from 16.6 g. of 2-bromopyridine, 0.6 g. lithium metal and 11 g. of n-butylbromide) maintaining the temperature at −40° C. Stir for one hour after the completion of the addition and then add 100 ml. of 10% ammonium chloride solution. Extract the mixture with chloroform. Dry the chloroform layer, concentrate and distill under reduced pressure to obtain 2-(2-methoxybenzoyl)-pyridine.

By following this procedure, other starting ketones may be prepared including 2-(2-chlorobenzoyl)-pyridine, 3-(3-chlorobenzoyl)-pyridine, 3-(2 - methoxybenzoyl)-pyridine, 2-(3-methoxybenzoyl)-pyridine, 2-(2,4-dichlorobenzoyl)-pyridine.

*(2) Reaction of a benzaldehyde with a pyridyl lithium to give a substituted phenylpyridyl carbinol which upon oxidation forms a benzoylpyridine*

A carbinol obtained by the reaction of a substituted benzaldehyde and a pyridyl lithium is oxidized as follows: To a suspension of 50 g. of the carbinol in 2 l. of water, add an equivalent quantity of potassium permanganate and heat at steam bath temperature while stirring for about 4 hours or until the purple color is discharged, whichever is earlier. Cool, filter and wash the precipitate with hot water. Combine the filtrates and extract with chloroform. Dry the chloroform solution, concentrate to a residue and distill in vacuo.

By this method various substituted benzoylpyridines may be prepared including 2-(3-methyl-4-chlorobenzoyl)-pyridine, 2 - (3,5 - dichlorobenzoyl)-pyridine, 3-(2,4-dichlorobenzoyl)-pyridine.

EXAMPLE 1.—DIMETHYLAMINOETHYL ETHER OF 2-BENZOYL PYRIDINE OXIME

Dissolve 18.3 g. of 2-benzoyl pyridine and 17.5 g. of dimethylaminoethoxyamine dihydrochloride in a solution of 50 ml. of pyridine and 200 ml. of ethanol. While stirring, heat the reaction mixture at reflux temperature for about 4 hours. Remove the solvent in vacuo and dissolve the residue in water. Render this solution alkaline by the addition of saturated aqueous sodium bicarbonate solution. Extract with chloroform and wash the chloroform layer thoroughly with water to remove pyridine. Concentrate the chloroform solution on a steam bath and distill the residue under vacuum obtaining the oximino ether of this example, B.P. 174–176°/1.5 mm.

By substituting different benzoyl pyridines and/or different oximinating agents in the foregoing procedure, the obvious equivalent products are obtained. Listed below in tabular form are representations of benzoyl pyridine and oxyamine reactants. The products obtained therefrom are analogous to the ether of this example.

| Pyridine Reactant ( )-benzoyl pyridine | Oximinator (-oxyamine dihydrochloride) |
| --- | --- |
| 2-(3,4-dimethoxy)- | Dimethylaminoeth- |
| 2-(2-chloro)- | Do. |
| 2-(3-chloro)- | Do. |
| 2-(2-methoxy)- | Dimethylaminoprop- |
| 2-(3-methoxy)- | Diethylaminoeth- |
| 2-(3-methyl-4-chloro)- | Dimethylaminoprop- |
| 2-(3,5-dichloro)- | Diethylaminoeth- |
| 2-(2,4-dichloro)- | Piperidinoprop- |
| 3-(2-methoxy)- | Diethylaminoeth- |
| 3-(2,4-dichloro)- | Dimethylaminoeth- |
| 3- | Do. |
| 4- | Do. |
| 4- | Diethylaminoeth- |
| 2-(4-chloro)- | Dimethylaminoeth- |
| 4-(4-chloro)- | Diethylaminoeth- |
| 2-(4-methoxy)- | Dimethylaminoeth- |
| 2-(4-methyl)- | Diethylaminoeth- |
| 2-(4-hydroxy)- | Dimethylaminoeth- |
| 2- | Pyrrolidinoeth- |
| 2- | Pyrrolidinoprop- |
| 2- | Piperidinoeth- |
| 2- | Morpholinoeth- |
| 3- | Piperizinoprop- |

EXAMPLE 2.—2-DIETHYLAMINOETHYL ETHER OF 2-BENZOYL PYRIDINE OXIME

Prepare a solution of sodium ethoxide from 1.2 g. of sodium and 100 ml. of ethanol. Add 9.9 g. of 2-benzoyl pyridine oxime. While stirring and after 5 minutes add dropwise 13.7 g. of 2-diethylaminoethylchloride. Stir and reflux the mixture for 3 hours and then remove the ethanol in vacuo by heating at steam bath temperature. Admix the residue with water and extract with chloroform. Wash the chloroform extracts with water, dry and distill obtaining the oximino ether of this example, B.P. 190–195°/3 mm.

By substituting different benzoyl pyridine oximes and/or different aminoalkylating agents in the foregoing procedure, obvious equivalent products are obtained. Listed below in tabular form are representations of benzoyl pyridine oximes and aminoalkylating agents. The products obtained therefrom are analogous to the ether of this example.

| Benzoyl pyridine oxime | Aminoalkyl chloride |
| --- | --- |
| 2- | 2-diethylaminoethyl |
| 3- | Do. |
| 2- | 2-dimethylaminopropyl- |
| 2- | 5-dimethylaminopentyl- |
| 2- | 2-morpholinoethyl- |
| 2- | 2-pyrrolidinoethyl- |

EXAMPLE 3.—3-DIMETHYLAMINOPROPYL ETHER OF 2-BENZOYL PYRIDINE OXIME

Admix 19.5 g. of 2-benzoyl pyridine oxime, 15.7 g. of 3-dimethylaminopropyl chloride hydrochloride, 41.4 g. of anhydrous potassium carbonate and 200 ml. of anhydrous benzene. While stirring, heat the mixture at reflux for 15 hours. Cool and filter. Wash the precipitate with 50 ml. of warm benzene and combine the filtrates. Wash the filtrates with water, dry over anhydrous sodium sulfate, concentrate to a residue and distill in vacuo to obtain the oximino ether of this example.

Equivalent compounds are obtained by appropriate substitution of oxime reactant and/or the aminoalkyl halide.

In place of 2-benzoyl pyridine oxime there may be utilized 3-benzoyl pyridine oxime. The alkylating agent may be 3-piperidinopropyl chloride hydrochloride, 3-(1-methyl-4-piperizino)-propyl chloride hydrochloride and the like. The products obtained from such reactants reflect the obvious variation.

EXAMPLE 4.—DIETHYLCARBAMYL ESTER OF 2-BENZOYL PYRIDINE OXIME

Admix 17.9 g. of 2-benzoyl pyridine oxime, 4.7 g. of diethylcarbamyl chloride, 13.8 g. of anhydrous potassium carbonate and 150 ml. of toluene. While stirring, reflux the mixture for about 6 hours and then remove the inorganic salts by filtration. Extract the filtrate with 10% aqueous hydrochloric acid. Separate the aqueous phase and render it alkaline with sodium hydroxide while keeping the reaction temperature below 10° C. Extract the aqueous alkaline mixture with chloroform. Concentrate the chloroform solution to a residue and triturate the residue with petroleum ether to obtain a crude crystalline solid. Recrystallize from hexane to obtain the ester of this example, M.P. 55–56° C.

Alternative reactants are exemplified by the following: 2-(4-methyl)-benzoyl pyridine oxime, 2-(4-chloro)-benzoyl pyridine oxime, 2-(4-methoxy)-benzoyl pyridine oxime, 2-(4-hydroxy)-benzoyl pyridine oxime, 3-(4-hydroxy)-benzoyl pyridine oxime, and by dimethylcarbamyl chloride, pyrrolidino chloroformate, and the like. The variations in the reactants will be reflected in the final product.

An unsubstituted carbamate is obtained by reacting a benzoyl pyridine with hydrogen chloride and potassium cyanate according to known methods. From 2-benzoyl pyridine and the above reagents is obtained the carbamyl ester of 2-benzoyl pyridine.

It will be apparent to one skilled in the art that all addition salts of the oximino ethers may be prepared by any of the conventional methods such as dissolving the basic ether in an organic solvent in which the salt is not soluble and adding thereto an acid containing the desired anion. The precipitated salt is purified by recrystallization from solvents such as alcoholic ether. Representative salts are formed with inorganic acids such as hydrochloric and organic acids such as maleic, succinic, salicylic and the like. Salt formation generally renders the oximino ether water soluble and affords a means for handling the ether in the form of a crystalline solid.

It is known to chemists that the oximino ethers of this invention may exist in either one or both of two geometric configurations; one being syn and the other anti. Either or both structures are contemplated as with the scope of this invention.

I claim:

1. A compound of the group consisting of di-lower alkylamino lower alkyl ethers and di-lower alkyl carbamyl esters of benzoyl pyridine oxime and the non-toxic pharmaceutically acceptable acid addition salts thereof.

2. Di-lower alkylamino lower alkyl ether of benzoyl pyridine oxime.

3. Di-lower alkyl carbamyl ester of benzoyl pyridine oxime.

4. A compound of claim 1 of the formula:

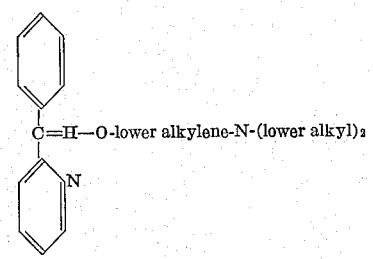

5. A compound of claim 1 of the formula:

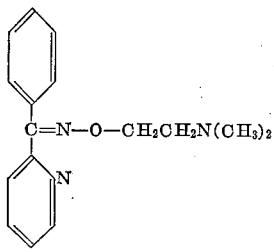

6. A compound of claim 1 of the formula:

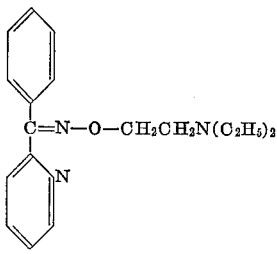

7. A compound of claim 1 of the formula:

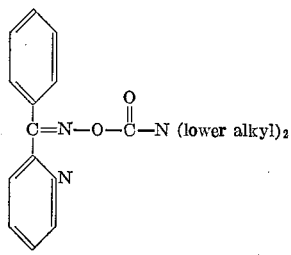

8. A compound of claim 1 of the formula:

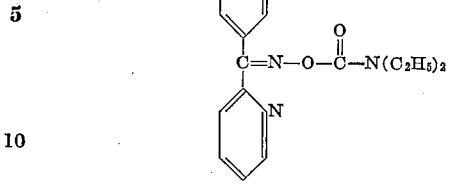

9. A process which comprises reacting benzoyl pyridine oxime with di-lower alkyl carbamyl chloride in an organic solvent in the presence of a base and heating the reaction mixture at a temperature from above room temperature to reflux and isolating the product thereby formed.

10. A process which comprises reacting benzoyl pyridine oxime with di-lower alkyl amino lower alkyl chloride hydrochloride in an organic solvent in the presence of a base and heating the reaction mixture at a temperature from above room temperature to reflux and isolating the product thereby formed.

References Cited by the Examiner
UNITED STATES PATENTS
3,060,177  10/1962  Druey et al. _____ 260—296

OTHER REFERENCES
Huntress et al.: J.A.C.S., vol. 70, pp. 37-2-7 (1948).

WALTER A. MODANCE, *Primary Examiner.*

NICHOLAS S. RIZZO, ROBERT T. BOND, *Examiners.*